(12) United States Patent
Cilia

(10) Patent No.: US 9,143,670 B1
(45) Date of Patent: Sep. 22, 2015

(54) VIDEO CAPTURE SYSTEM INCLUDING TWO INDEPENDENT IMAGE SENSORS

(71) Applicant: COPsync, Inc., Dallas, TX (US)

(72) Inventor: Andrew Cilia, McKinney, TX (US)

(73) Assignee: COPsync, Inc., Dallas, TX (US)

(*) Notice: Subject to any disclaimer, the term of this patent is extended or adjusted under 35 U.S.C. 154(b) by 140 days.

(21) Appl. No.: 13/790,182

(22) Filed: Mar. 8, 2013

Related U.S. Application Data

(60) Provisional application No. 61/674,231, filed on Jul. 20, 2012.

(51) Int. Cl.
*H04N 5/225* (2006.01)
*H04N 5/232* (2006.01)

(52) U.S. Cl.
CPC ......... *H04N 5/2258* (2013.01); *H04N 5/23245* (2013.01)

(58) Field of Classification Search
CPC .............................. H04N 5/23245; H04N 7/18
USPC .............................. 348/118, 148, 220.1, 222.1
See application file for complete search history.

(56) References Cited

U.S. PATENT DOCUMENTS

| | | | |
|---|---|---|---|
| 7,092,015 B1* | 8/2006 | Sogawa | 348/222.1 |
| 7,307,655 B1* | 12/2007 | Okamoto et al. | 348/222.1 |
| 2004/0027451 A1* | 2/2004 | Baker | 348/46 |
| 2005/0073436 A1* | 4/2005 | Negreiro | 348/148 |
| 2012/0002065 A1* | 1/2012 | Park et al. | 348/220.1 |
| 2012/0029773 A1* | 2/2012 | Fujita et al. | 701/41 |

* cited by examiner

*Primary Examiner* — Gevell Selby
(74) *Attorney, Agent, or Firm* — Fish & Richardson P.C.

(57) ABSTRACT

An in-vehicle video system comprising a forward-looking video camera system that includes two independent image sensors and associated digital signal processors for processing imagery received from the respective independent image sensors. The in-vehicle-video system may also comprise a microphone and a transmitter; and a computing system for interfacing with the forward-looking video camera system configured to control the capture, storage and processing of video, still images and audio received from the transmitter and the forward-looking video camera system. The computing system is operable to control image capture including enabling the forward-looking video camera system in a plurality of modes, and to command the forward-looking video camera system to transition to a first mode including commanding a first independent image sensor to capture high-resolution video imagery while a second independent image sensor of the two independent image sensors is capturing still images.

20 Claims, 2 Drawing Sheets

VIDEO CAPTURE SYSTEM INCLUDING TWO INDEPENDENT IMAGE SENSORS

CROSS-REFERENCE TO RELATED APPLICATION

This application claims priority to U.S. Provisional Application No. 61/674,231, filed on Jul. 20, 2012. The disclosure of the prior application is considered part of and is incorporated by reference in the disclosure of this application.

BACKGROUND

This specification relates to capturing and storing data.

Police officers deployed in a vehicle are often in situations where events occur that necessitate the capture and storage of information related to the events. For example, a police officer can stop a car for speeding or another violation. Information associated with the car and/or interactions with the occupant(s) may be of interest because the information can be used later as evidence or for training purposes. Types of information of interest can include video, audio or still imagery of what is occurring in and in view of the police officer or the vehicle. For example, audio of police officer interactions with the occupant(s) or other people, location information, and physical conditions related to the police car and equipment in or near the car can be important to capture and store.

SUMMARY

In general, an in-vehicle video system comprises a forward-looking video camera system that includes two independent image sensors and associated digital signal processors for processing imagery received from the respective independent image sensors. An in-vehicle-video system may also comprise a microphone and a transmitter; a computing system for interfacing with the forward-looking video camera system configured to control the capture, storage and processing of video, still images and audio received from the transmitter and the forward-looking video camera system. The computing system is operable to control image capture including enabling the forward-looking video camera system in a plurality of modes, to command the forward-looking video camera system to transition to a first mode including commanding a first independent image sensor to capture high-resolution video imagery while a second independent image sensor of the two independent image sensors is capturing still images.

Aspects of the invention make include none, one or more of the following advantages. Video processing in the proposed system (recording, compression, encryption, transmission, etc.) is performed by software running on the in-vehicle computer (mobile data terminal) and the software or firmware running in the forward facing camera. One advantage of this over a traditional digital video recorder (DVR) or other "hardware centric systems" is that a software driven video (SDV) system is inherently less expensive because with SDV each car only needs a mobile data terminal rather than a mobile data terminal PLUS an expensive DVR. This point is relevant at both the time of initial purchase and the time of replacing the system, which occurs when the agency replaces the car about every 3 years. Another advantage arises when changes, modifications, upgrades, bug fixes, etc. are necessary, these can be done seamlessly through the "air" (or whatever connectivity modality exists) rather than having to send a person to the agency site to replace the in-vehicle hardware or install new firmware in the DVR, etc.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems associated with an in-vehicle video system that can capture and store video, imagery and other information. The in vehicle video system can be deployed, for example, a law enforcement vehicle. The system can include a forward-looking video camera system that includes two or more independent image sensors and associated digital signal processors for processing imagery received from the respective independent image sensors. The system can also include a microphone and a transmitter. A computer system associated with the in-vehicle video system can interface with the forward-looking video camera system, and can be configured to control the capture, storage and processing of video, still images and audio received from the transmitter and the forward-looking video camera system (along with other data received from sensors or the like associated with the vehicle). The computing system can be operable to control image capture including enabling the forward-looking video camera system in a plurality of modes. The computing system can also command the forward-looking video camera system to transition to a first mode including commanding a first independent image sensor to capture high-resolution video imagery while a second independent image sensor of the two independent image sensors is capturing still images. For example, high-resolution images can be at least 5 to 14 MegaPixels.

Figure 1:
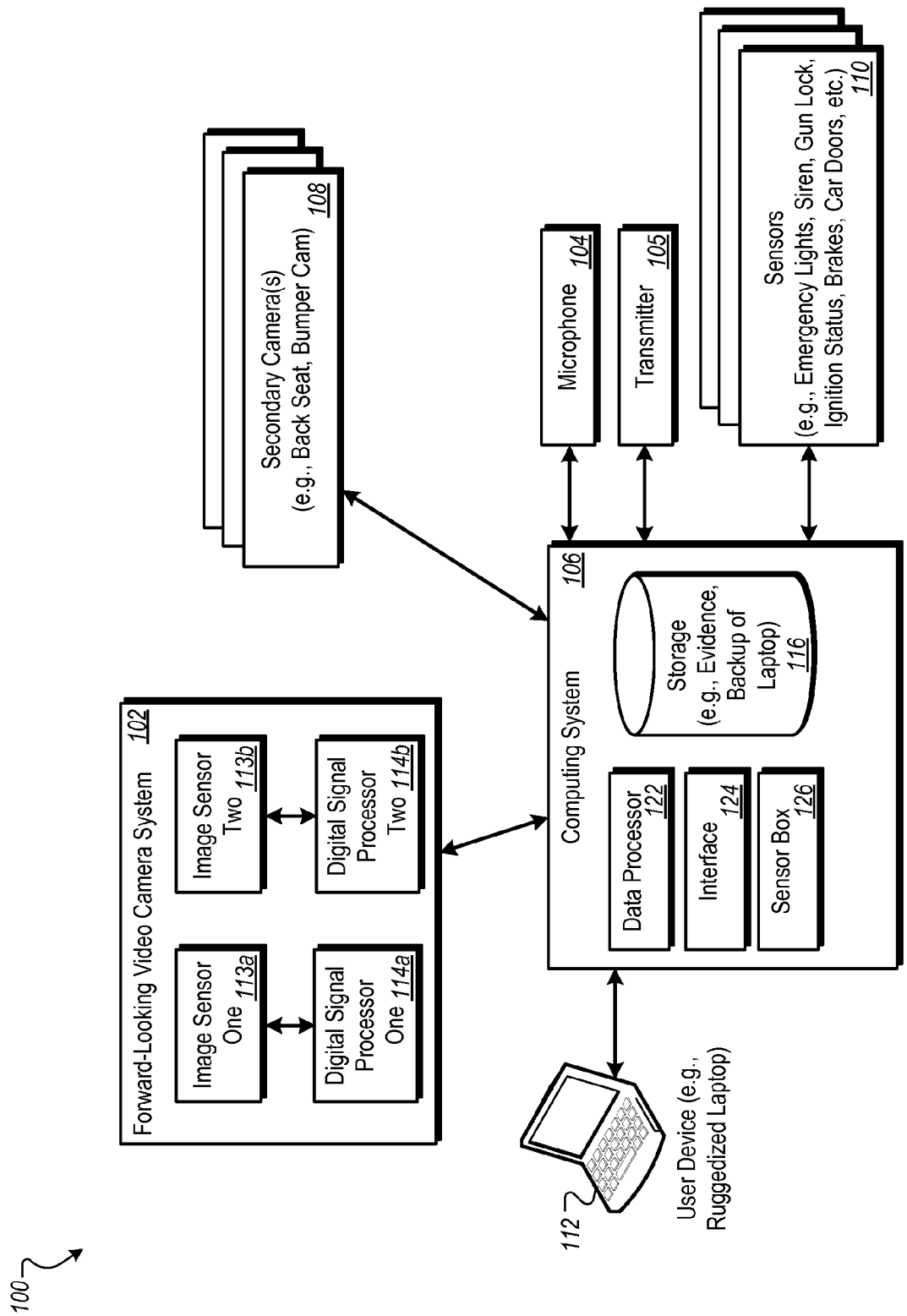
FIG. 1 is a block diagram of an example data capture and storage system.

FIG. 1 is a block diagram of an example data capture and storage system 100. For example, the system 100 can be an in-vehicle video system for capturing and storing information related to conditions, events and interactions of a law enforcement officer in and near a police vehicle. The system 100 includes at least one forward-looking video camera system 104 for capturing video and images, a microphone 104 for capturing audio, a transmitter 105 for transmitting captured audio, and a computing system 106 for interfacing with the forward-looking video camera system 102 and further configured to control the capture, storage and processing of video, still images and audio received from the transmitter 105 and the forward-looking video camera system 102. Some implementations of the system 100 include a user device 112, e.g., a ruggedized laptop or other computer for the user (e.g., a police officer) to interface with the system 100. The user device 112 can be a mobile computer that includes a user interface and, for example, operates a windows-based or other operating system.

Some implementations of the forward-looking video camera system 104 include two independent image sensors 113a and 113b and associated digital signal processors 114a and 114b for processing imagery received from the respective independent image sensors 113a and 113b. In some implementations, only a single multi-purpose digital signal processor is provided to support both independent image sensors 113a and 113b.

The computing system 106 is operable to control image capture including enabling and controlling the forward-looking video camera system 102 in a plurality of modes. For example, the computing system can command the forward-looking video camera system 102 to transition to a first mode including commanding the first independent image sensor 113a to capture high-resolution video imagery while the second independent image sensor 113b is capturing still images. Some implementations of the computing system 106 include a processor 122 for processing data collected from components of the system 100, an interface 124 for interfacing with the user device 112, and a sensor box 126 for processing sensor data received from sensors that are communicatively coupled to the computing system 106. For example, the sensor box 126 can receive inputs from one or more vehicle sensors and provide sensor input to the computing system 106 to enable the execution of the preprogrammed actions (e.g., to provide commands to the forward-looking video camera system 102). One example command is to automatically start capturing video if motion is detected in front of the vehicle, the vehicle's speed is above a threshold velocity, or if the emergency (e.g., flashing) lights and/or siren(s) of the vehicle are in operation.

In some implementations, the computing system 108 is further operable to command the forward-looking video camera system 102 to transition to a second mode. For example, the computing system 108 can command the first independent image sensor 113a and associated digital signal processor 114a to capture and compress video while the second independent image sensor 113b and associated digital signal processor 114b is analyzing objects in a field of view of the second independent image sensor 113b and taking preprogrammed actions when objects and/or other vehicle sensors provide input that match a predefined set of target situations. For example, one or more of the vehicle sensors can be sensors that are related to a speed or movement of an associated vehicle (e.g., a police car or other cars in the field of view of the police car). Other modes and preprogrammed actions are discussed in further detail below.

In some implementations, the system 100 can also include an interface coupled between the forward-looking video camera system 102 and the computing system 106 for passing commands and video and captured imagery between the respective components. For example, the computing system 106 can use the interface to control the forward-looking video camera system 102, e.g., to control its modes of operation. The forward-looking video camera system 102 can use the interface for passing captured video and still images to the computing system 106.

In some implementations, the computing system 106 can receive data in the form of compressed video and still imagery from the interface and can perform further processing, user presentation and storage of the received or further processed data. For example, the computing system 106 can decompress compressed imagery received from the forward-looking video camera system 102 before sending the imagery to the user device 112 for presentation to a user (e.g., police officer).

Example microphones 105 include a wireless microphone that is configured for easy deployment on or in proximity to an operator of the vehicle for capturing audio data associated with events along with video and still imagery captured by the forward-looking video camera system 102. For example, the police officer can carry the wireless microphone (e.g., on a belt pack) which can capture audio that is associated with the video being captured by the forward-looking video camera system 102. The computing system 106 can capture the audio so that the audio can be played back later in parallel with captured video.

Different types of vehicle sensors can exist, including a global positioning system (GPS), an accelerometer, a temperature gauge, and analog or digital sensors coupled to different components of the vehicle so as to enable the sensor box 226 to sense and react to a change of state (such as associated with a change of state of the vehicle). As a result, the computing system 106 can initiate one or more preprogrammed actions for execution by the forward-looking video camera system 102.

The in computing system 106 can further include a circular buffer configured to store a predetermined amount of received data, e.g., at least approximately 10-100 hours of video data or other size equivalents of other date. The circular buffer can overwrite old data as it fills in some implementations. Alternatively, the computing system can automatically further compress stored data, provide a warning to the operator, or enable transfer of data so as to avoid losing data.

In some implementations, the system can also include one or more secondary cameras 108 that are configured to capture video and still images, such as a rear facing camera, or a camera for the rear compartment of the vehicle. When one or more secondary cameras 108 are present, the computing system 106 can be further operable to interface with the one or more secondary cameras 108 and process and store video and still images received from the one or more secondary cameras 108.

Figure 2:
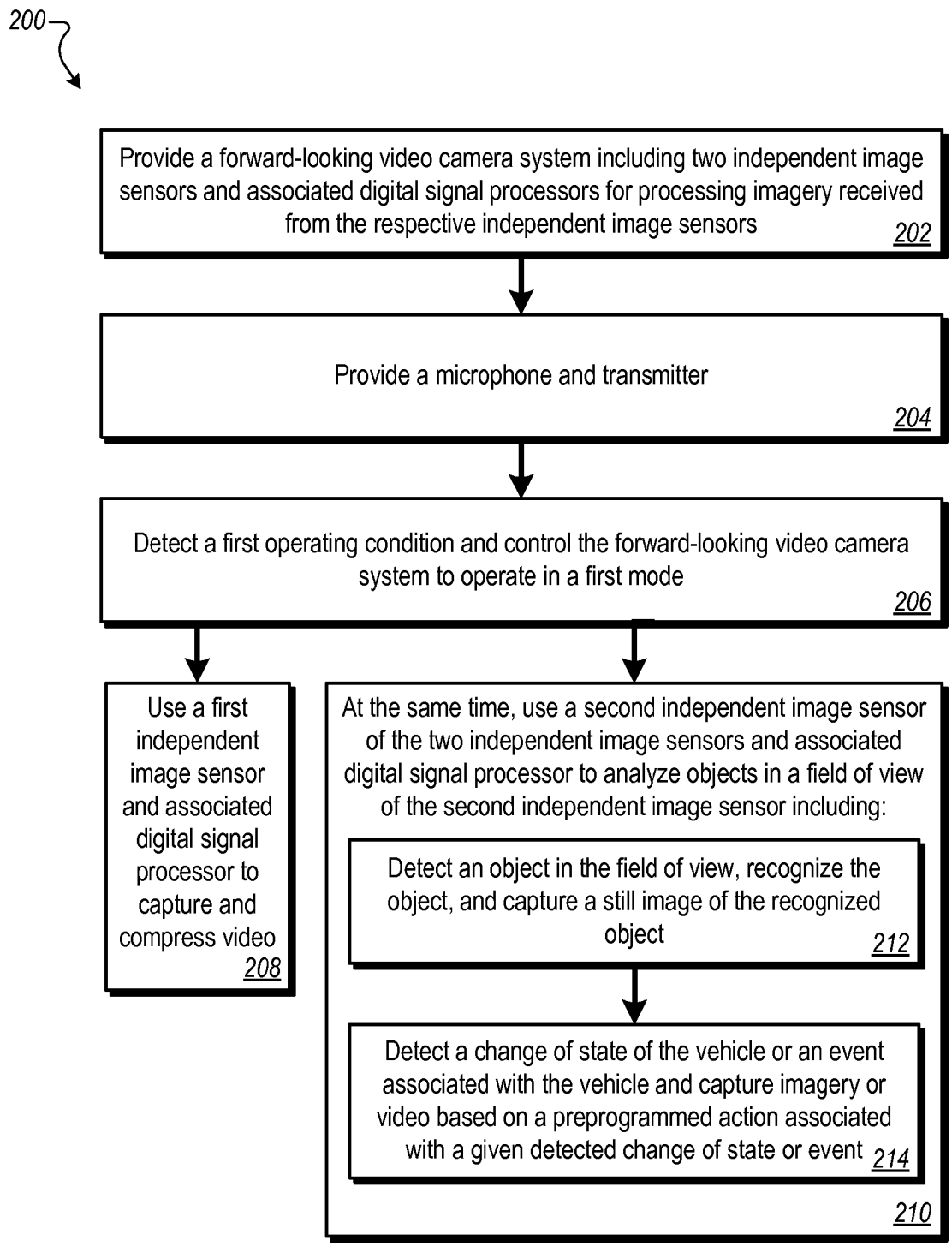
FIG. 2 is a flow diagram of an example process for capturing and storing information.

FIG. 2 is a flowchart of an example process 200 for capturing and event related information. The process 200 can be performed by the system 100 (and/or its components). FIG. 1 is used to provide example structures for performing the steps of the process 200.

A forward-looking video camera system is provided that includes two independent image sensors and associated digital signal processors for processing imagery received from the respective independent image sensors (202). For example, a police car can be equipped with a system, such as the system 100 that includes the forward-looking video camera system 102. A computing system, such as computing system 106, can receive video and still imagery from the forward-looking video camera system 102.

A microphone and a transmitter are provided (204). For example, the system in the police car can include the microphone 104 for capturing audio and the transmitter 105 for transmitting the captured audio to the computing system 106.

A first operating condition is detected and the forward-looking video camera system is controlled to operate in a first mode (206). For example, the first operating condition can be to obtain information about what is in front of a police car, and the computing system 106 can direct the forward-looking video camera system 102 to capture video.

A first independent image sensor and associated digital signal processor captures and compresses video (208). For example, the computing system 106 can direct the forward-looking video camera system 102 to signal the first independent image sensor 113a to start capturing video. As the video is captured, the associated digital signal processor 114a can compress the video.

At the same time, a second independent image sensor of the two independent image sensors and associated digital signal processor analyzes objects in a field of view of the second independent image sensor (210). For example, while the first independent image sensor 113a is capturing video, the second independent image sensor 113b can identify objects (e.g., cars, license plates, people, etc.) in the field of view, and the digital signal processor 114b can process the images.

An object in the field of view is detected, the object is recognized, and a still image of the recognized object is captured (212). For example, second independent image sensor 113b can detect and recognize a license plate, and the computing system 106 can compare a detected license number on the license plate to a list of wanted license numbers. If a match is detected, for example, between the license number on the license plate and the list of wanted license plates, then the computing system 106 can provide an alert to an operator, e.g., by sending a message that can be displayed on the user device 112.

A change of state of the vehicle or an event associated with the vehicle is detected and imagery or video is captured that is based on a preprogrammed action associated with a given detected change of state or event (214). As an example, the detected change of state can include detecting that vehicle emergency lights or sirens are activated and/or detecting a rate of speed above a predetermined amount for the vehicle. As a result of the detected state, the preprogrammed action can include, for example, searching for and capturing still images of faces or a target vehicle in front of the forward-looking video camera system 102. In another example, the preprogrammed action can also include capturing license plate imagery associated with the target vehicle, or activating the siren or other equipment in order to startle an attacker.

In some implementations, the detected state can be characterized by the emergency lights being on and the vehicle being stopped. As a result of the detected state in this example, the preprogrammed action can be the capturing of a series of images so as to be able to identify one or more of the make, model, color, license plate, markings, or occupants in a target vehicle.

An example detected event associated with the vehicle can be a fight or a struggle between an operator of the vehicle and an occupant of a target vehicle. As a result of the detected event in this example, the preprogrammed action can be to capture high-resolution video or imagery (e.g., using the forward-looking video camera system 102). Moreover, as a further result of the detected event, the process 200 can further include activating a warning signal upon detecting the event.

In some implementations, the change of state can be characterized by the vehicle being stopped with emergency lights on. As a result of the change of state in this example, the preprogrammed action can include evaluating a scene presented to the second independent image sensor 113b to detect one or more predetermined scenarios.

Example scenarios can include identifying a suspect, detecting a discharge of a weapon, detecting a fight or struggle, or detecting administration of a road side test (e.g., sobriety tests) by the operator of the vehicle. In some implementations, information related to these or other scenarios can be disseminated to other entities in law enforcement, e.g., depending on or more criteria associated with the detected scenario (e.g., if a fight is detected, provide a warning signal locally (to startle the attacker) or alert other nearby entities for assistance).

In some implementations, the process 200 can further include receiving a signal from an operator of the vehicle to capture a high-resolution image with the second independent image sensor 113b or to start or stop video recording with the first independent image sensor 113a. For example, a police officer operating the user device 112 or some other control of the system 100 can issue a command to start or stop capturing video, or to capture a still image in range of a camera of the system 100.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An in-vehicle video system comprising:
a forward-looking video camera system including two independent image sensors and associated digital signal processors for processing imagery received from the respective independent image sensors;
a microphone and a transmitter;
a computing system for interfacing with the forward-looking video camera system configured to control the capture, storage and processing of video, still images and audio received from the transmitter and the forward-looking video camera system; and
the computing system operable to control image capture including enabling the forward-looking video camera system in a plurality of modes, the computing system operable to command the forward-looking video camera system to transition to a first mode including commanding a first independent image sensor to capture high-resolution video imagery while a second independent image sensor of the two independent image sensors is capturing still images, and to transition to a second mode wherein the first independent image sensor captures and compresses video while the second independent image sensor analyzes objects in a field of view of the second independent image sensor and takes preprogrammed actions when objects are recognized in the field of view and/or other vehicle sensors provide input that match a predefined set of target situations.

2. The in-vehicle video system of claim 1 wherein the vehicle sensors include sensors related to a speed or movement of an associated vehicle.

3. The in-vehicle video system of claim 1 further comprising an interface coupled between the forward-looking video camera system and the computing system for passing commands and video and captured imagery between the respective components.

4. The in-vehicle video system of claim 3 wherein the computing system receives data in the form of compressed video and still imagery from the interface and is operable to perform further processing, user presentation and storage of the received or further processed data.

5. The in-vehicle video system of claim 1 wherein the microphone further includes a wireless microphone configured for easy deployment on or in proximity to an operator of the vehicle for capturing audio data associated with events along with video and still imagery captured by the forward-looking video camera system.

6. The in-vehicle video system of claim 1 further comprising a sensor box that receives inputs from one or more vehicle sensors and provides sensor input to the computing system to enable the execution of the preprogrammed actions.

7. The in-vehicle video system of claim 6 wherein the vehicle sensors are selected from the group comprising a GPS, accelerometer, temperature, or analog or digital sensors coupled to different components of the vehicle so as to enable the sensor box to sense and react to a change of state of the vehicle and initiate one or more preprogrammed actions for execution by the forward-looking video camera system.

8. The in-vehicle video system of claim 1 wherein the computing system further includes a circular buffer configured to store a predetermined amount of received data.

9. The in-vehicle video system of claim 8 wherein the predetermined amount is approximately 10-100 hours of video data.

10. The in-vehicle video system of claim 1 further comprising:
one or more secondary cameras configured to capture video and still images;
wherein the computing system is further operable to interface with the one or more secondary cameras and process and store video and still images received from the one or more secondary cameras.

11. A method for capturing event data associated with a vehicle comprising:
providing a forward-looking video camera system including two independent image sensors and associated digital signal processors for processing imagery received from the respective independent image sensors;
providing a microphone and transmitter; and
detecting, using at least one of the two independent image sensors, a first operating condition and, based on the detecting, controlling the forward-looking video camera system to operate in a first mode including:
using a first independent image sensor and associated digital signal processor to capture and compress video; and
using a second independent image sensor of the two independent image sensors and associated digital signal processor to analyze objects in a field of view of the second independent image sensor including:
detecting an object in the field of view, recognizing the object and, based on the detecting and recognizing, capturing a still image of the recognized object; and
detecting a change of state of the vehicle or an event associated with the vehicle and, based on the detecting of the change in state, capturing imagery or video based on a preprogrammed action associated with a given detected change of state or event.

12. The method of claim 11 wherein the object is a license plate and the method further includes comparing a license number in a list of wanted license numbers and providing an alert to an operator when a match is detected.

13. The method of claim 11 wherein detecting a change of state includes detecting that vehicle emergency lights or sirens are activated and detecting a rate of speed above a predetermined amount for the vehicle, and wherein the preprogrammed action includes searching for and capturing still images of faces or a target vehicle in front of the forward-looking video camera system.

14. The method of claim 13 wherein the preprogrammed action includes also capturing license plate imagery associated with the target vehicle.

15. The method of claim 11 wherein the detected state is emergency lights on and vehicle stopped, and wherein the preprogrammed action is capturing a series of images so as to be able to identify one or more of make, model, color, license plate, markings, or occupants in a target vehicle.

16. The method of claim 11 wherein the event is a fight or struggle between an operator of the vehicle and an occupant of a target vehicle, and wherein the preprogrammed action is capturing high-resolution video or imagery, and wherein the method further includes activating a warning signal upon detecting the event.

17. The method of claim 11 wherein the change of state is vehicle stopped with emergency lights on and the preprogrammed action includes evaluating a scene presented to the second independent image sensor to detect one or more predetermined scenarios.

18. The method of claim 17 wherein the scenarios are selected from the group comprising identifying a suspect, detecting a discharge of a weapon, detecting a fight or struggle, or detecting administration of a road side test by the operator of the vehicle.

19. The method of claim 17 further comprising disseminating information related to the scenarios to other entities in law enforcement depending on or more criteria associated with the detected scenario.

20. The method of claim 11 further comprising receiving a signal from an operator of the vehicle to capture a high-resolution image with the second independent image sensor or to start or stop video recording with the first independent image sensor.

* * * * *